United States Patent
Lee et al.

(10) Patent No.: US 8,462,851 B2
(45) Date of Patent: Jun. 11, 2013

(54) VIDEO ENCODING METHOD AND APPARATUS AND VIDEO DECODING METHOD AND APPARATUS

(75) Inventors: Kyo-hyuk Lee, Yongin-si (KR);
Sang-rae Lee, Suwon-si (KR);
Jae-chool Lee, Suwon-si (KR);
Jung-hye Mim, Yongin-si (KR);
Woo-jin Han, Suwon-si (KR); Il-koo Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 995 days.

(21) Appl. No.: 12/173,413

(22) Filed: Jul. 15, 2008

(65) Prior Publication Data
US 2009/0103620 A1 Apr. 23, 2009

(30) Foreign Application Priority Data
Oct. 17, 2007 (KR) ........................ 10-2007-0104466

(51) Int. Cl.
*H04N 7/12* (2006.01)
(52) U.S. Cl.
USPC .................................................... 375/240.16
(58) Field of Classification Search
None
See application file for complete search history.

(56) References Cited

U.S. PATENT DOCUMENTS

| 6,882,685 B2 | 4/2005 | Malvar |
| 2004/0013202 A1 | 1/2004 | Lainema |
| 2004/0081238 A1 | 4/2004 | Parhy |
| 2007/0019729 A1 | 1/2007 | Nakagomi et al. |
| 2009/0103620 A1* | 4/2009 | Lee et al. .................. 375/240.16 |
| 2012/0177106 A1* | 7/2012 | Escoda et al. ............ 375/240.03 |

OTHER PUBLICATIONS

Jongmin You et al., "16×16 Macroblock Partition Siuze Prediction for H.264 P Slices", IEEE Transactions on Consumer Electronics, Nov. 30, 2006, pp. 1377-1383, vol. 52, No. 4.
Tien-Ying Kuo et al., "Fast Macroblock Partition Prediction for H.264/AVC", IEEE International Conference on Multimedia and Expo, Jun. 30, 2004, pp. 675-678, vol. 01.

* cited by examiner

*Primary Examiner* — Andrew Lai
*Assistant Examiner* — Leon Andrews
(74) *Attorney, Agent, or Firm* — Sughrue Mion, PLLC

(57) ABSTRACT

Provided are an encoding and decoding method and an apparatus for implementing the same in which a processing order for predetermined-size blocks included in a macroblock is defined in order to efficiently use spatial correlation in an image. After a macroblock is divided into first blocks of a predetermined size and motion compensation is performed on each of the first blocks, a second-block processing order for sequentially processing second blocks included in a current first block is determined in order to process a residue between a motion compensation value of the current first block and the current first block in units of the second blocks having a smaller size than that of the current first block.

12 Claims, 8 Drawing Sheets

VIDEO ENCODING METHOD AND APPARATUS AND VIDEO DECODING METHOD AND APPARATUS

CROSS-REFERENCE TO RELATED PATENT APPLICATION

This application claims the benefit of Korean Patent Application No. 10-2007-0104466, filed on Oct. 17, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a video encoding method and apparatus and a video decoding method and apparatus, and more particularly, to a video encoding method and apparatus and a video decoding method and apparatus in which a processing order for predetermined-size blocks included in a macroblock is defined in order to efficiently use spatial correlation in an image.

2. Description of the Related Art

In the H.264/Moving Picture Experts Group (MPEG)—4 Advanced Video Coding (AVC) encoder/decoder (CODEC) standard, video data is compressed by performing a prediction process on sample data in block units in order to obtain a prediction block composed of prediction samples, and then, transforming and quantizing the prediction block.

Two methods are used for the prediction process: intraprediction and interprediction. Interprediction involves performing motion compensation/estimation with reference to a reference picture that has passed through an encoding/decoding process, and deblocking filtering. Intraprediction is performed on a current picture using data of neighboring blocks that are previously encoded. Video data compressed through a prediction process and a transformation and quantization process is compressed again through an entropy coding process to become a bitstream conforming to the H.264/AVC standard.

FIG. 1 illustrates prediction modes in the H.264/AVC standard according to division of a macroblock and a sub-macroblock.

In FIG. 1, various prediction modes classified according to a macroblock division type for interprediction are shown. According to the H.264/AVC standard, the available prediction modes are a 16×16 prediction mode, an 8×16 prediction mode, a 16×8 prediction mode, and an 8×8 prediction mode. Also, according to the H.264/AVC standard, the available prediction modes according to division of a sub-macroblock are a 4×8 prediction mode, an 8×4 prediction mode, and a 4×4 prediction mode.

Interprediction can be performed in those 7 prediction modes. For example, in the 8×8 prediction mode, motion compensation and motion prediction are performed on each of four 8×8 blocks included in a macroblock in order to generate a motion-compensation prediction value for each 8×8 block. In this case, each 8×8 block may further be divided into 4×4 blocks for motion compensation and motion prediction. In motion compensation and motion prediction, blocks obtained by dividing a macroblock are subject to motion compensation and motion prediction sequentially in the order illustrated in FIG. 1.

Once a residue between a prediction block obtained by motion compensation and motion prediction and a block corresponding to an original image is calculated, the residue passes through transformation and quantization. In the H.264/AVC standard, transformation and quantization are performed on the residue in 4×4 block units.

FIG. 2 illustrates a related art order of processing 4×4 blocks when transformation and quantization of a residue are processed in 4×4 block units in prediction modes according to the H.264/AVC standard.

Referring to FIG. 2, residues generated by motion compensation and motion prediction using one of 16×16, 16×8, 8×16, 8×8, 8×4, 4×8, and 4×4 blocks pass through transformation and quantization in 4×4 block units according to an order illustrated in FIG. 2. For example, after motion compensation and motion prediction are performed in 16×8 block units, transformation and quantization are performed in 4×4 block units according to the order illustrated in FIG. 2 for a residue between a prediction block of each 16×8 block and an original input block.

According to the related art order of processing 4×4 blocks for transformation and quantization, even after motion compensation and motion prediction are completed for some blocks obtained by dividing a macroblock, 4×4 block-based transformation and quantization for a residue are performed in a fixed processing order regardless of a macroblock division type. As a result, a motion compensation and motion prediction processing order is not consistent with a transformation/quantization processing order and thus a synchronous block process may not be possible for some macroblock division types. For example, referring to FIG. 2, when a macroblock 21 is divided into two 8×16 blocks 21a and 21b for motion compensation and motion prediction, the left 8×16 block 21a is motion-compensated and motion-predicted before the right 8×16 block 21b. However, in transformation and quantization, the lower 4×4 residues in the left 8×16 block 21a are processed 8th, 9th, 10th, and 11th after upper 4×4 residues in the right 8×16 block 21b are processed 4th, 5th, 6th, and 7th. Similarly, when an 8×8 block 23 is divided into two 4×8 blocks 23a and 23b for motion compensation and motion prediction, the left 4×8 block 23a is motion-compensated and motion-predicted before the right 4×8 block 23b, but lower 4×4 residues in the left 4×8 block 23a are transformed and quantized after upper 4×4 residues of the right 4×8 block 23b.

As such, according to this related art, in the case of some macroblock division types, even if motion compensation and motion prediction of a block are completed, subsequent processing of the block, e.g., transformation, quantization, and deblocking filtering, can be performed only after processing of other blocks is completed.

Moreover, when spatial correlation between a current block to be encoded and neighboring blocks thereof is used, data of the neighboring blocks may not be properly used due to non-completion of processing of the data of the neighboring blocks according to some macroblock division types.

SUMMARY OF THE INVENTION

The present invention provides a video encoding method and apparatus and a video decoding method and apparatus in which a block-processing order is defined for a macroblock division type in order to efficiently use spatial correlation between a current block and neighboring blocks of the current block during processing of the current block.

According to an aspect of the present invention, there is provided a video encoding method including dividing a macroblock into first blocks of a predetermined size and performing motion compensation on each of the first blocks, determining a second-block processing order for second blocks of a smaller size than that of the first block for sequentially processing the second blocks included in the same first block in order to process a residue between a motion compensation value of the first block, which is generated by the motion compensation, and the first block in units of the second blocks, and processing the residue according to the determined second-block processing order in units of the second blocks included in the same first block.

According to another aspect of the present invention, there is provided a video encoding apparatus including a motion compensation unit dividing a macroblock into first blocks of a predetermined size and performing motion compensation on each of the first blocks, a control unit determining a second-block processing order for second blocks of a smaller size than that of the first block for sequentially processing the second blocks included in the same first block in order to process a residue between a motion compensation value of the first block, which is generated by the motion compensation, and the first block in units of the second blocks, and a video processing unit processing the residue according to the determined second-block processing order in units of the second blocks included in the same first block.

According to another aspect of the present invention, there is provided a video decoding method including reading a prediction mode of a current macroblock to be decoded and a second-block processing order for second blocks included in predetermined-size first blocks obtained by dividing the current macroblock in the prediction mode from an input bitstream, and sequentially processing the second blocks included in the same first block according to the read second-block processing order.

According to another aspect of the present invention, there is provided a video decoding apparatus including a control unit reading a prediction mode of a current macroblock to be decoded and a second-block processing order for second blocks included in predetermined-size first blocks obtained by dividing the current macroblock in the prediction mode from an input bitstream, and a video processing unit sequentially processing the second blocks included in the same first block according to the read second-block processing order under the control of the control unit.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
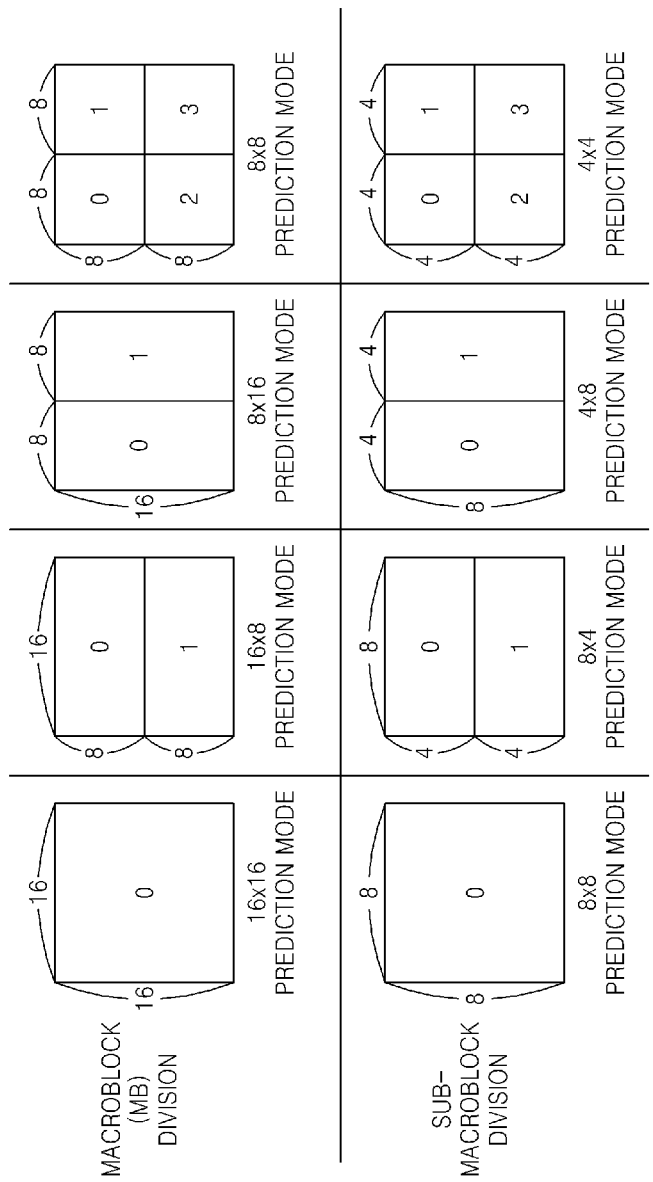
FIG. 1 illustrates prediction modes in the H.264/Advanced Video Coding (AVC) standard according to division of a macroblock and a sub-macroblock.

Hereinafter, exemplary embodiments of the present invention will be described in detail with reference to the accompanying drawings. It should be noted that like reference numerals refer to like elements illustrated in one or more of the drawings. In the following description of exemplary embodiments of the present invention, detailed description of known functions and configurations incorporated herein will be omitted for conciseness and clarity.

Figure 3:
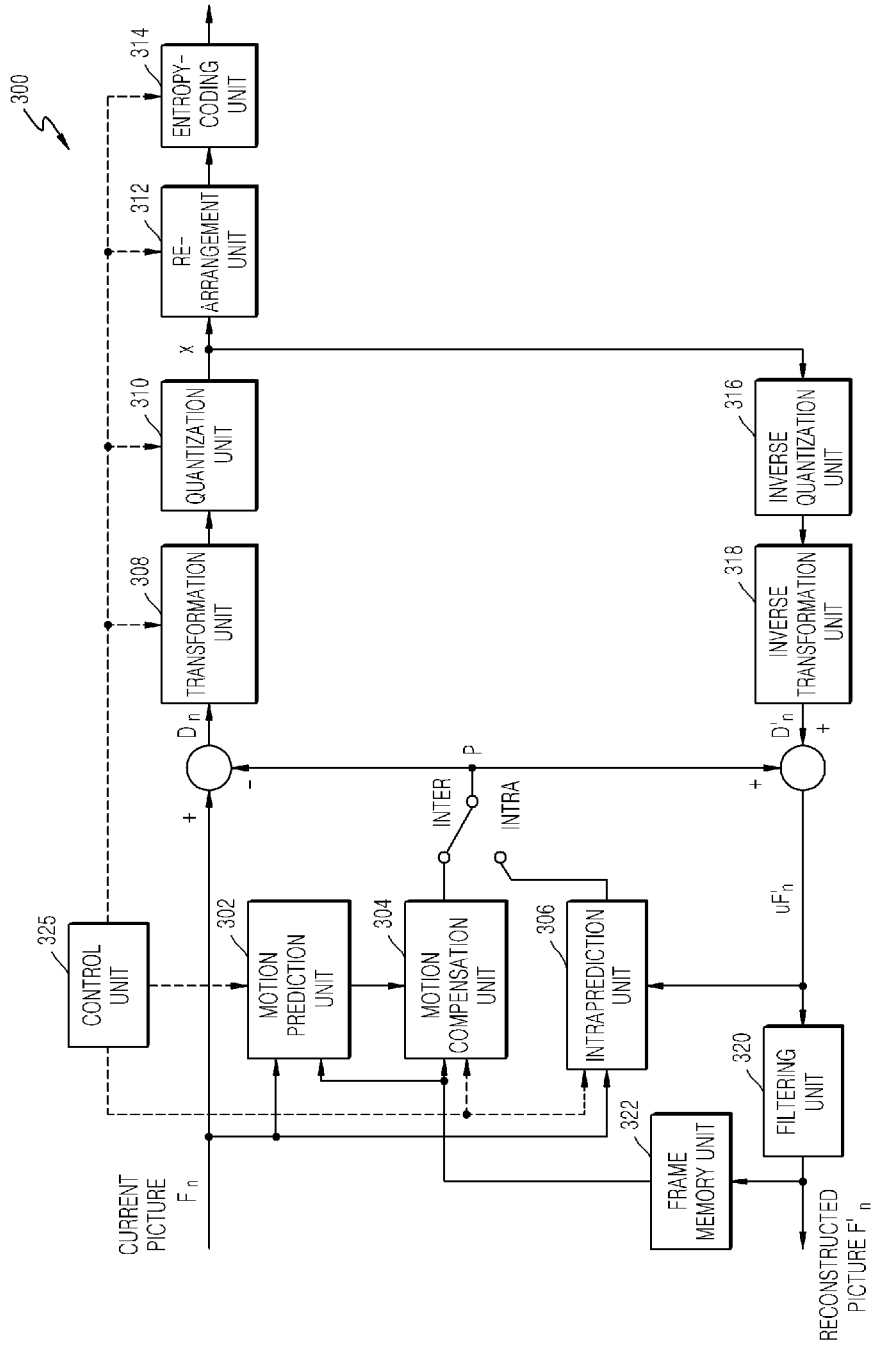
FIG. 3 is a block diagram of a video encoding apparatus according to an exemplary embodiment of the present invention.

FIG. 3 is a block diagram of a video encoding apparatus 300 according to an exemplary embodiment of the present invention. Even through the video encoding apparatus 300 will be described according to the H.264/AVC standard, for convenience of explanation, the video encoding apparatus 300 can also be applied to other video encoding methods that process an image in block units.

Referring to FIG. 3, the video encoding apparatus 300 includes a motion prediction unit 302, a motion compensation unit 304, an intraprediction unit 306, a transformation unit 308, a quantization unit 310, a re-arrangement unit 312, an entropy-coding unit 314, an inverse quantization unit 316, an inverse transformation unit 318, a filtering unit 320, a frame memory unit 322, and a control unit 325.

The motion prediction unit 302 divides a current macroblock included in a current picture into first blocks of a predetermined size and performs motion prediction on each of the first blocks. The predetermined size of the first blocks may be one of 16×16, 16×8, 8×16, 8×8, 8×4, 4×8, and 4×4 pixels as illustrated in FIG. 1. The motion prediction unit 302 performs motion prediction by searching for a counterpart region that is most similar to a current first block in a predetermined search range of a reference picture that is stored in the frame memory unit 322 after being previously encoded and reconstructed, and outputs a motion vector indicating displacement between the current first block and a counterpart region of the reference picture.

The motion compensation unit 304 generates a motion compensation value that is a prediction value for the current first block by using information about the counterpart region indicated by the motion vector.

The intraprediction unit 306 performs intraprediction by searching for a prediction value for a current block in a current picture. According to the H.264/AVC standard, a macroblock is divided into 16×16 blocks or 4×4 blocks for intraprediction.

Once a prediction block for a current block is generated by interprediction or intraprediction, a residue between the current block and the prediction block is generated and the generated residue is transformed into the frequency domain by the transformation unit 308 and then quantized by the quantization unit 310. The entropy-coding unit 314 encodes the quantized residue in order to output a bitstream.

A quantized picture is reconstructed by the inverse quantization unit 316 and the inverse transformation unit 318 to obtain a reference picture. The reconstructed current picture passes through the filtering unit 320 for deblocking filtering and then is stored in the frame memory 322 to be used in prediction of a next picture. As will be described below, the transformation unit 308, the quantization unit 310, the inverse quantization unit 316, the inverse transformation unit 318, and the filtering unit 320 sequentially process second blocks included in the same first block under the control of the control unit 325.

The control unit 325 controls components of the video encoding apparatus 300, determines a second-block processing order for sequentially processing the second blocks included in the same first block in order to process a residue between a motion compensation value generated by motion compensation of the first block and the first block in units of the second blocks having a smaller predetermined size than that of the first block, and controls video processing units such as the transformation unit 308, the quantization unit 310, the inverse quantization unit 316, the inverse transformation unit 318, and the filtering unit 320 to process the residue according to the determined second-block processing order in units of the second blocks included in the first block.

Figure 4:
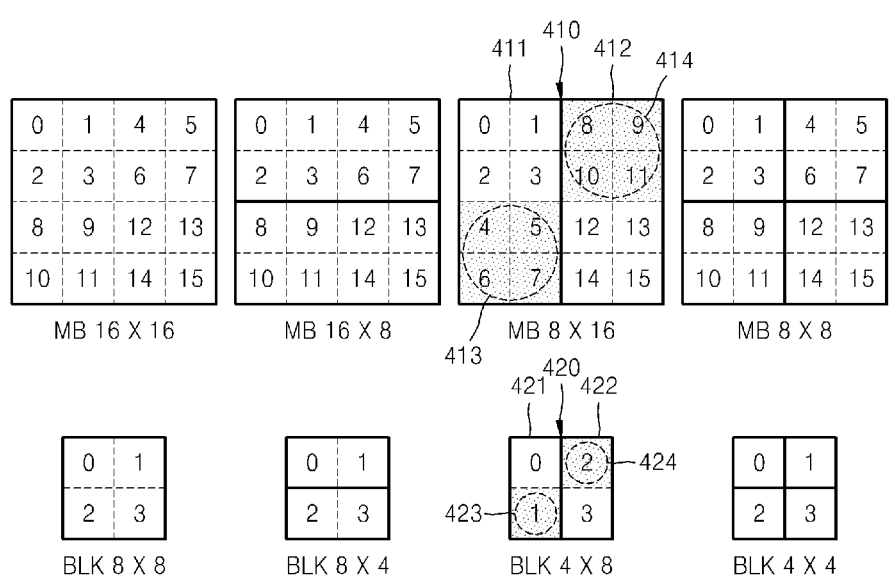
FIG. 4 illustrates a processing order for 4×4 blocks for a motion compensation value, according to an exemplary embodiment of the present invention.

FIG. 4 illustrates a processing order for 4×4 blocks for a motion compensation value, according to an exemplary embodiment of the present invention. In FIG. 4, macroblock (MB) A×B represents a case where a macroblock is motion-compensated and motion-predicted in A×B block units and block (BLK) C×D represents a case where an 8×8 sub-macroblock is motion-compensated and motion-predicted in C×D block units.

Figure 2:
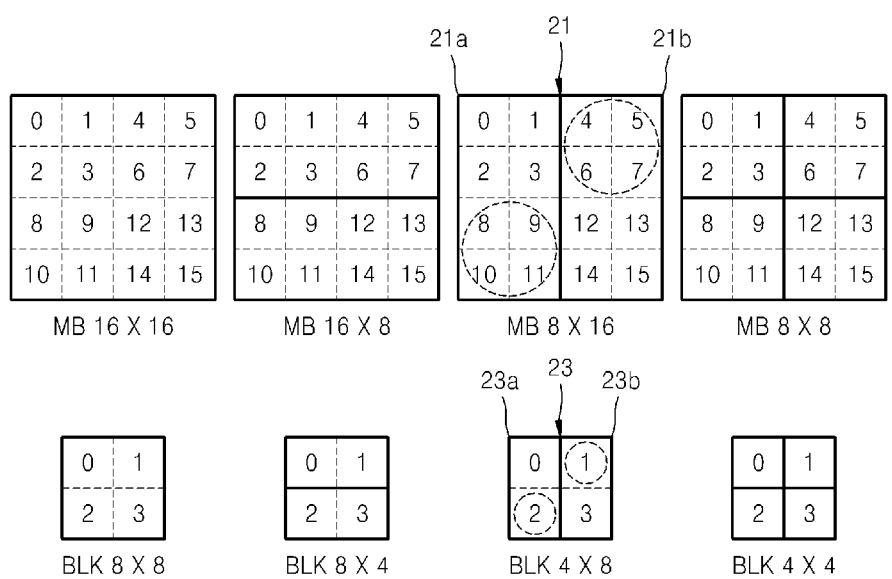
FIG. 2 illustrates a related art order of processing 4×4 blocks when transformation and quantization of a residue are processed in 4×4 block units in prediction modes according to the H.264/Advanced Video Coding (AVC) standard.

Referring to FIG. 4, residues generated by motion compensation and motion prediction in units of 16×16, 16×8, 8×16, 8×8, 8×4, 4×8, and 4×4 blocks undergo transformation and quantization in 4×4 block units according to the processing order illustrated in FIG. 4. Inconsistency between a motion compensation and a motion prediction processing order and a transformation and a quantization processing order becomes an issue when a macroblock is divided into 8×16 blocks or 4×8 blocks to be processed. According to an exemplary embodiment of the present invention, the control unit 325 determines a second-block processing order in order to sequentially process second blocks included in the same first block. For example, when a macroblock 410 is divided into two 8×16 blocks 411 and 412 and transformation and quantization are performed in 4×4 block units after motion compensation and motion prediction of the 8×16 blocks 411 and 412, the control unit 325 determines a 4×4-block processing order such that 4×4 blocks included in the left 8×16 block 411 can be processed first. When compared with FIG. 2, hatched lower 4×4 blocks 413 from among 4×4 blocks included in the left 8×16 block 411 are processed 8th, 9th, 10th, and 11th according to the prior art. However, according to an exemplary embodiment of the present invention, the lower 4×4 blocks 413 in the left 8×16 block 411 are processed 4th, 5th, 6th, and 7th, i.e., processed before upper 4×4 blocks 412 included in the right 8×16 block 412. Similarly, when an 8×8 sub-macroblock 420 is divided into two 4×8 blocks 421 and 422 and the two 4×8 blocks 421 and 422 are motion-compensated and motion-predicted, lower 4×4 block 423 included in the left 4×8 block 421 is processed before upper 4×4 blocks 424 included in the right 4×8 block 422 according to an exemplary embodiment of the present invention.

According to the 4×4-block processing order of an exemplary embodiment of the present invention, when motion compensation is performed in units of first blocks of a predetermined size and then subsequent processing operations such as transformation, quantization, inverse quantization, inverse transformation, and deblocking filtering are performed on a motion-compensation result of a current first block in units of second blocks of a smaller size than that of the first block, second blocks of a first motion-compensated first block are first processed and thus processing results of a previous first block can be used to process a next first block, thereby efficiently performing processing using spatial correlation in an image.

Figure 5:
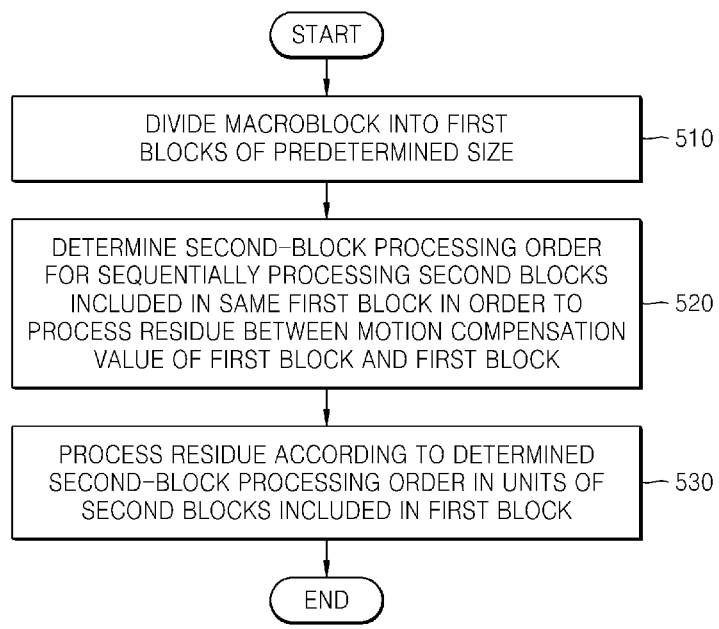
FIG. 5 is a flowchart illustrating a video encoding method according to an exemplary embodiment of the present invention.

FIG. 5 is a flowchart illustrating a video encoding method according to an exemplary embodiment of the present invention.

Referring to FIG. 5, in operation 510, a macroblock included in an input image is divided into first blocks of a predetermined size and motion compensation is performed on each of the first blocks. The predetermined size may be one of 16×16, 16×8, 8×16, 8×8, 8×4, 4×8, and 4×4 pixels according to the H.264/AVC standard. In particular, an exemplary embodiment of the present invention may be applied to a case where a macroblock is divided into a smaller-size block along a vertical axis like when the first blocks have a predetermined size of 8×16 or 4×8.

In operation 520, in order to process a residue between an input first block and a motion compensation value of the first block generated by motion compensation in units of second blocks having a smaller size than that of the first block, a second-block processing order for sequentially processing the second blocks is determined. The second-block processing order may be determined such that second blocks included in the same first block are processed from top to bottom and from left to right. When a macroblock or a sub-macroblock is divided into two left and right blocks along a vertical axis like when the first blocks have a size of 8×16 or 4×8, the second-block processing order may be determined such that second blocks included in a left first block are processed before second blocks included in a right first block because data of a previous block can be efficiently used when a macroblock is processed from top to bottom and from left to right according to a raster scan method during video processing using spatial correlation.

In operation 530, the residue is processed according to the determined second-block processing order in units of second blocks included in the same first block. As stated above, a second-block based processing process includes video processing processes such as transformation, quantization, inverse quantization, inverse transformation, and deblocking filtering, and a block processing order according to an exemplary embodiment of the present invention can also be applied to other processes for block-based processing of a subsequent image using a motion compensation value.

Even though a first block has a size of 8×16 or 4×8 and a second block has a size of 4×4 in the foregoing exemplary embodiment of the present invention, 8×8-block based transformation may be performed in an extended profile of the H264/AVC standard. In this case, a first block has a size of 8×16 and a second block has a size of 8×8.

Figure 6:
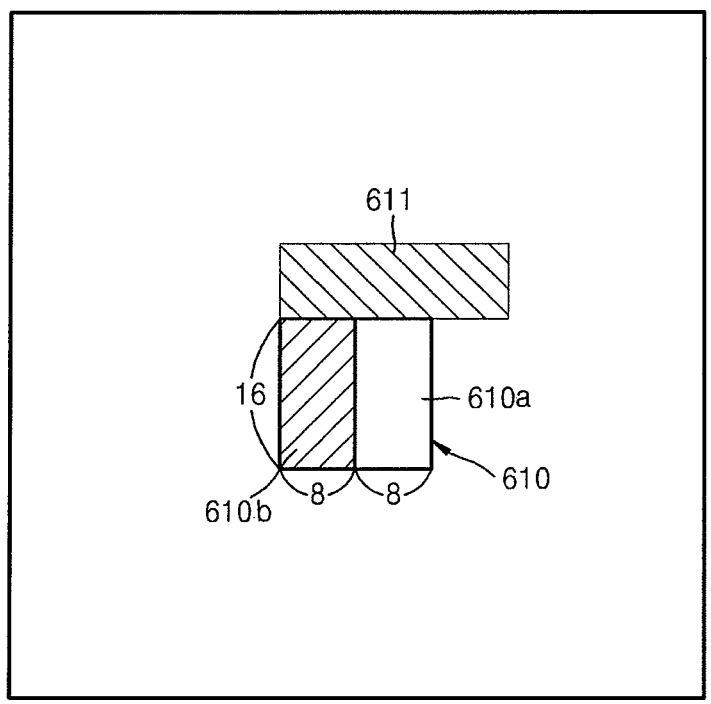
FIG. 6 is a diagram for explaining data of available neighboring blocks when a macroblock is encoded using the video encoding method, according to an exemplary embodiment of the present invention.

FIG. 6 is a diagram for explaining data of available neighboring blocks when a macroblock is encoded using the video encoding method, according to an exemplary embodiment of the present invention.

Referring to FIG. 6, when a current macroblock 610 to be encoded is divided into two 8×16 blocks 610a and 610b, lower 4×4 blocks in the left 8×16 block 610b are processed after transformation and quantization of upper 4×4 blocks in the right 8×16 block 610a according to the prior art. As a result, data of the left 8×16 block 610b in the same macroblock 610 cannot be used to encode the right 8×16 block 610a. In this case, according to the related art, only upper neighboring data 611 that has already been encoded and reconstructed can be used. However, according to an exemplary embodiment of the present invention, since video processing processes such as transformation and quantization are first performed on 4×4 blocks of the left 8×16 block 610*b* according to a motion compensation processing order, data of the left 8×16 block 610*b* that has already been processed and reconstructed can be used to encode the right 8×16 block 610*a*. Therefore, according to an exemplary embodiment of the present invention, spatially adjacent data can be used, thereby improving video encoding efficiency.

Figure 7:
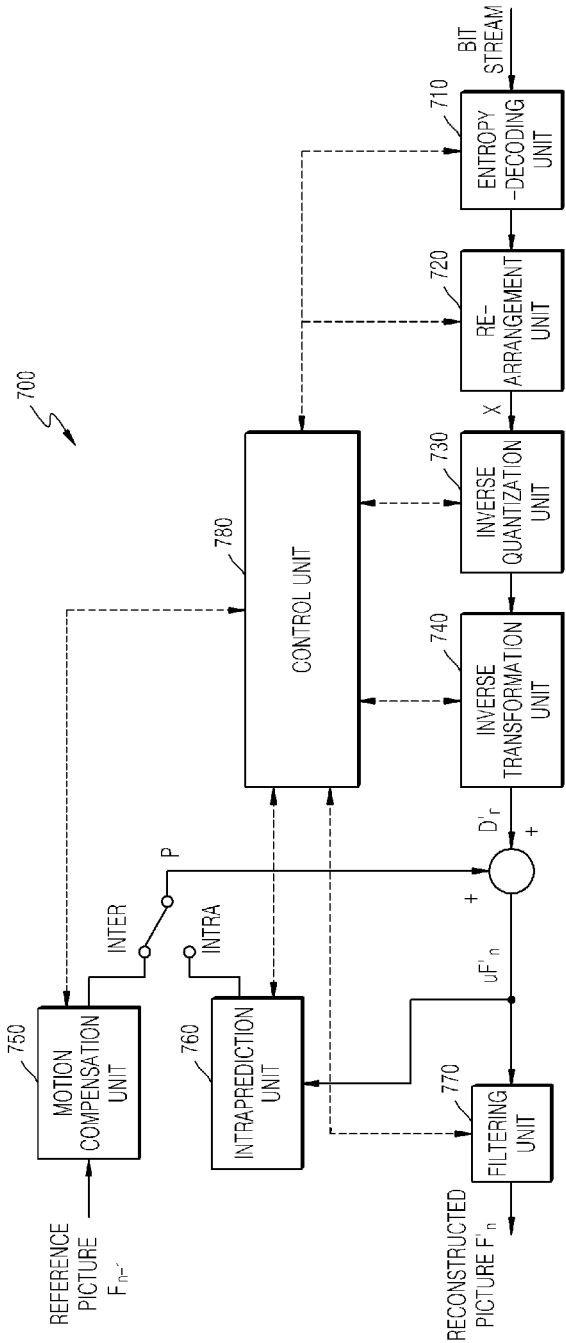
FIG. 7 is a block diagram of a video decoding apparatus according to an exemplary embodiment of the present invention.

FIG. 7 is a block diagram of a video decoding apparatus 700 according to an exemplary embodiment of the present invention.

Referring to FIG. 7, the video decoding apparatus 700 includes an entropy-decoding unit 710, a re-arrangement unit 720, an inverse quantization unit 730, an inverse transformation unit 740, a motion compensation unit 750, an intraprediction unit 760, a filtering unit 770, and a control unit 780.

The entropy-decoding unit 710 and the re-arrangement unit 720 receive a compressed bitstream and perform entropy-decoding on the bitstream in order to generate quantized coefficients. The inverse quantization unit 730 and the inverse transformation unit 740 perform inverse quantization and inverse transformation on the quantized coefficients in order to extract transformation encoding coefficients, motion vector information, and prediction mode information. The prediction mode information may include a predetermined flag indicating whether second blocks included in the same first block are sequentially processed using a video encoding method according to an exemplary embodiment of the present invention and block division information indicating the size of blocks into which each macroblock is divided for motion compensation and motion prediction.

The intraprediction unit 760 generates a prediction block for the intraprediction-encoded current block by using previously decoded neighboring blocks of the current block.

The motion compensation unit 750 generates a prediction block for the current block by determining a counterpart region of previously decoded reference pictures by using a motion vector of the current block included in the bitstream. In particular, according to an exemplary embodiment of the present invention, the motion compensation unit 750 sequentially processes second blocks included in the same first block according to a second-block processing order determined by the control unit 780 and under the control of the control unit 780.

The motion compensation unit 750 and the intraprediction unit 760 add a residue D'n between the current block and the prediction block P, which is extracted from the bitstream, to the prediction block P in order to generate reconstructed video data uF'n. The reconstructed video data uF'n passes through the filtering unit 770, thereby finally decoding the current block.

The control unit 780 reads a prediction mode for a current macroblock to be decoded and a processing order for second blocks included in each of predetermined-size first blocks obtained by dividing the current macroblock in the prediction mode from the bitstream, and controls the second-block processing order.

Figure 8:
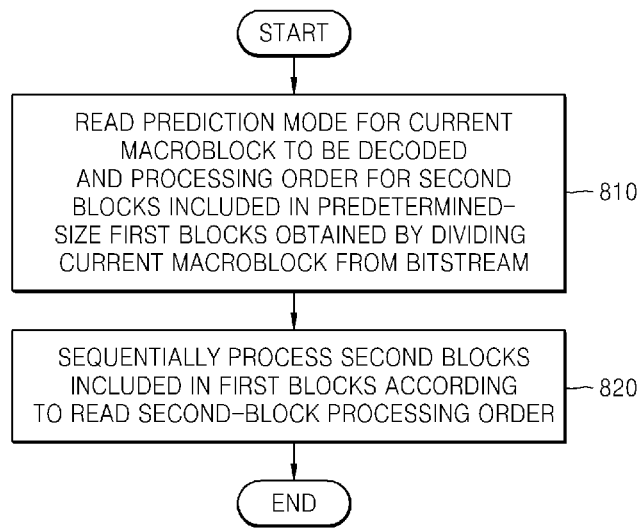
FIG. 8 is a flowchart illustrating a video decoding method according to an exemplary embodiment of the present invention.

FIG. 8 is a flowchart illustrating a video decoding method according to an exemplary embodiment of the present invention.

Referring to FIG. 8, in operation 810, a prediction mode for a current macroblock to be decoded and a processing order for second blocks included in each of predetermined-size first blocks obtained by dividing the current macroblock in the prediction mode from an input bitstream is determined.

In operation 820, the second blocks included in the same first block are sequentially processed according to the read second-block processing order.

As described above, according to an exemplary embodiment of the present invention, a processing order for blocks obtained by dividing a macroblock is defined suitably for a motion compensation processing order for the divided blocks, thereby efficiently using data of neighboring blocks and thus improving video encoding efficiency.

The present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), compact disk (CD)-ROMs, magnetic tapes, floppy disks, and optical data storage devices. The computer-readable recording medium can also be distributed over network of coupled computer systems so that the computer-readable code is stored and executed in a decentralized fashion.

While the present invention has been particularly shown and described with reference to exemplary embodiments thereof, it will be understood by one of ordinary skill in the art that various changes in form and detail may be made therein without departing from the spirit and scope of the present invention as defined by the following claims.

What is claimed is:

1. A video encoding method comprising:

dividing, by a video encoding apparatus, a macroblock into first blocks of a predetermined size and performing motion compensation on each of the first blocks;

determining, by the video encoding apparatus, a second-block processing order for second blocks of a size smaller than the predetermined size of the first blocks, based on a macroblock division type for motion compensation, for sequentially processing the second blocks included in a current first block of the first blocks in order to transform a residue between a motion compensation value of the current first block, which is generated by the motion compensation, and the current first block in units of the second blocks; and transforming, by the video encoding apparatus, the residue according to the determined second-block processing order in units of the second blocks included in the current first block, wherein when the macroblock division type for motion compensation is one of 8×16 and 4×8 blocks, a processing order of the second blocks for the transforming of the residue is determined such that the second blocks included in a same first block are processed before second blocks included in other first block are processed, and wherein the predetermined size of the first block is one of 8×16 and 4×8 pixels, the size of each of the second blocks is one of 8×8 and 4×4 pixels if the size of the first block is 8×16, and the size of each of the second blocks is 4×4 pixels if the size of the first block is 4×8.

2. The video encoding method of claim 1, wherein the determining of the second-block processing order comprises determining the second-block processing order such that the second blocks included in the current first block are processed from top to bottom and from left to right.

3. The video encoding method of claim 1, wherein the determining of the second-block processing order comprises determining the second-block processing order such that the second blocks included in a left one of the first blocks included in the macroblock are processed before the second blocks included in a right one of the first blocks included in the macroblock.

4. The video encoding method of claim 1, wherein the processing of the residue comprises at least one of transformation, quantization, inverse quantization, inverse transformation, and deblocking filtering of the residue.

5. A video encoding apparatus comprising:
a motion compensation unit which divides a macroblock into first blocks of a predetermined size and performs motion compensation on each of the first blocks;
a control unit which determines, based on a macroblock division type for motion compensation, a second-block processing order for second blocks of a size smaller than the predetermined size of the first blocks for sequentially processing the second blocks included in a current first block of the first blocks in order to transform a residue between a motion compensation value of the current first block, which is generated by the motion compensation, and the current first block in units of the second blocks; and
a video processing unit transforming the residue according to the determined second-block processing order in units of the second blocks included in the current first block,
wherein when the macroblock division type for motion compensation is one of 8×16 and 4×8 blocks, a processing order of the second blocks for the transforming of the residue is determined such that the second blocks included in a same first block are processed before second blocks included in other first block are processed, and
wherein the predetermined size of the first block is one of 8×16 and 4×8 pixels, the size of each of the second blocks is one of 8×8 and 4×4 pixels if the size of the first block is 8×16, and the size of each of the second blocks is 4×4 pixels if the size of the first block is 4×8.

6. The video encoding apparatus of claim 5, wherein the control unit determines the second-block processing order such that the second blocks included in the current first block are processed from top to bottom and from left to right.

7. The video encoding apparatus of claim 5, wherein the control unit determines the second-block processing order such that the second blocks included in left one of the first blocks included in the macroblock are processed before the second blocks included in right one of the first blocks.

8. The video encoding apparatus of claim 5, wherein the video processing unit performs at least one of transformation, quantization, inverse quantization, inverse transformation, and deblocking filtering of the residue.

9. A video decoding method comprising:
reading, by a video decoding apparatus, a prediction mode of a current macroblock to be decoded and a second-block processing order, based on a macroblock division type, for second blocks included in first blocks of a predetermined size obtained by dividing the current macroblock in the prediction mode from an input bitstream; and
sequentially processing, by the video decoding apparatus, the second blocks included in a current first block of the first blocks according to the read second-block processing order
wherein when the macroblock division type for motion compensation is one of 8×16 and 4×8 blocks, a processing order of the second blocks for the transforming of the residue is determined such that the second blocks included in a same first block are processed before second blocks included in other first block are processed, and
wherein the predetermined size of the first block is one of 8×16 and 4×8 pixels, the size of each of the second blocks is one of 8×8 and 4×4 pixels if the size of the first block is 8×16, and the size of each of the second blocks is 4×4 pixels if the size of the first block is 4×8.

10. The video decoding method of claim 9, wherein the second-block processing order is such that the second blocks included in the current first block from top to bottom and from left to right and the second blocks included in a left one of the first blocks included in the current macroblock are processed before the second blocks included in a right one of the first blocks included in the current macroblock.

11. A video decoding apparatus comprising:
a control unit which reads a prediction mode of a current macroblock to be decoded and a second-block processing order, based on a macroblock division type, for second blocks included in first blocks of a predetermined size obtained by dividing the current macroblock in the prediction mode from an input bitstream; and
a video processing unit which sequentially processes the second blocks included in a current first block of the first blocks according to the read second-block processing order under the control of the control unit
wherein when the macroblock division type for motion compensation is one of 8×16 and 4×8 blocks, a processing order of the second blocks for the transforming of the residue is determined such that the second blocks included in a same first block are processed before second blocks included in other first block are processed, and
wherein the predetermined size of the first block is one of 8×16 and 4=8 pixels, the size of each of the second blocks is one of 8×8 and 4×4 pixels if the size of the first block is 8×16, and the size of each of the second blocks is 4×4 pixels if the size of the first block is 4×8.

12. The video decoding apparatus of claim 11, wherein the control unit determines the second-block processing order such that the second blocks included in the current first block from top to bottom and from left to right and the second blocks included in a left one of the first blocks included in the current macroblock are processed before the second blocks included in a right one of the first blocks.

* * * * *